United States Patent
Tarbell et al.

(10) Patent No.: US 9,770,981 B2
(45) Date of Patent: Sep. 26, 2017

(54) SYSTEM AND METHOD FOR UNIFIED TORQUE TRANSMISSION AND ROTARY SEALING

(71) Applicant: General Electric Company, Schenectady, NY (US)

(72) Inventors: Gregory Tarbell, Lawrence Park, PA (US); Anthony Giammarise, Lawrence Park, PA (US); Jeremy Plummer, Lawrence Park, PA (US); Carlos Vallejo, Lawrence Park, PA (US); Steven Owens, Lawrence Park, PA (US); Dennis Richter, Lawrence Park, PA (US); Gregory Hecker, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/506,868

(22) Filed: Oct. 6, 2014

(65) Prior Publication Data
US 2015/0107406 A1   Apr. 23, 2015

Related U.S. Application Data

(60) Provisional application No. 61/892,598, filed on Oct. 18, 2013.

(51) Int. Cl.
*B60K 17/04* (2006.01)
*B60B 27/00* (2006.01)
(Continued)

(52) U.S. Cl.
CPC ........ *B60K 17/046* (2013.01); *B60B 27/0026* (2013.01); *B60B 27/0073* (2013.01);
(Continued)

(58) Field of Classification Search
None
See application file for complete search history.

(56) References Cited

U.S. PATENT DOCUMENTS

| | | | |
|---|---|---|---|
| 8,215,430 B2 * | 7/2012 | Thomson | B60K 7/0015 180/305 |
| 2009/0215568 A1* | 8/2009 | Shibukawa | B60K 17/046 475/159 |

(Continued)

FOREIGN PATENT DOCUMENTS

| | | |
|---|---|---|
| JP | 2008121660 A | 5/2008 |
| JP | 2013170679 A | 9/2013 |
| WO | 2006087785 A1 | 8/2006 |

OTHER PUBLICATIONS

Unofficial English Translation of Japanese Office Action issued in connection with corresponding JP Application No. 2014-210352 on Sep. 15, 2015.

*Primary Examiner* — Huan Le
*Assistant Examiner* — Lori Wu
(74) *Attorney, Agent, or Firm* — Global Patent Operation; John A. Kramer (57) ABSTRACT

A torque transmission and sealing assembly includes a ring gear having a first axial end, a second axial end opposite the first axial end, an inner surface including a plurality of teeth and an axial-facing surface at the first axial end, a barrel portion joined to the second axial end of the ring gear, and a plurality of annular, axial extending fingers integrally formed with the ring gear and extending from the axial-facing surface.

19 Claims, 5 Drawing Sheets

(51) Int. Cl.
*B60K 7/00* (2006.01)
*F16D 1/10* (2006.01)
*B60B 11/02* (2006.01)

(52) U.S. Cl.
CPC ............ *B60K 7/0007* (2013.01); *F16D 1/101* (2013.01); *B60B 11/02* (2013.01); *B60K 2007/0038* (2013.01); *B60K 2007/0092* (2013.01); *B60Y 2200/142* (2013.01); *F16D 2300/08* (2013.01); *Y10T 29/49465* (2015.01); *Y10T 74/19* (2015.01)

(56) References Cited

U.S. PATENT DOCUMENTS

| | | | |
|---|---|---|---|
| 2012/0200043 A1* | 8/2012 | Witcher | B60K 17/046 277/306 |
| 2012/0205966 A1* | 8/2012 | Witcher | B60B 35/125 301/126 |
| 2013/0095974 A1* | 4/2013 | Imai | F16H 57/0479 475/159 |

* cited by examiner

SYSTEM AND METHOD FOR UNIFIED TORQUE TRANSMISSION AND ROTARY SEALING

CROSS-REFERENCE TO RELATED APPLICATIONS

This application claims priority to U.S. Provisional Application No. 61/892,598, filed Oct. 18, 2013.

FIELD OF THE INVENTION

Embodiments of the invention relate to wheel drive assemblies, and, more particularly, to wheel drive assemblies for off-highway vehicles.

BACKGROUND OF THE INVENTION

Off-highway vehicles ("OHVs"), such as mining vehicles used to haul heavy payloads, typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine drives the alternator and the alternator, in turn, powers the main traction inverter thereby supplying electrical power having a controlled voltage and frequency to electric drive motors of the wheel drive assemblies. Each wheel drive assembly houses a planetary gear transmission that converts the rotation of the associated drive motor energy into a high torque, low speed rotational energy output which is supplied to the wheels.

Planetary gear transmissions are generally operated in a wet lubricated condition. As will be appreciated, it is generally desirable to minimize or prevent leakage of lubricants, e.g., oil, from wheel drive assemblies as such leakage leads to vehicle downtime for disassembly, inspection and repair.

In connection with the above, OHV wheel assemblies typically include a torque tube sealing arrangement that performs both torque transmission and sealing duties. In particular, typical wheel assemblies may include a torque tube to facilitate torque transfer to the wheels of the OHV, and a sealing component (referred to as an oil seal body or "flinger") attached to the torque tube via friction or interference fit and a multitude of clamp plates, bolts, and washers. The torque tube is a generally cylindrical component manufactured from a welded fabrication of steel barrels having gear teeth at one end and a flange for bolting to a wheel hub at the other. These gear teeth mesh with a planetary gear system in the wheel to transmit torque from the gear system to the wheel hub. The tires of the OHV are mounted to the wheel hub and the transmission of torque through the torque tube into the wheel hub rotates the tires and, therefore, moves the OHV forward.

The flinger is a cylindrical steel component containing a number of axial grooves that creates a geometry resembling fingers. These fingers mesh with a similar but mirrored component that is mounted on the wheel motor's stationary frame that, together, form a sealing labyrinth for containing oil within the wheel assembly of the OHV.

During operation of OHVs employing this type of torque tube sealing arrangements, the planetary gear system that is transmitting power to the torque tube may contribute to a triangularization or deformation effect in the torque tube. This deformation of the torque tube may be conferred onto the flinger that is attached to it. In particular, because the flinger is not mechanically fixed to the torque tube in the theta direction, it relies purely upon the friction generated by the interference fit and the clamp plates, bolts, and washers to keep it rotating in time with the torque tube. However, the potential deformation of the torque tube has the effect of potentially manifesting a shear force in the flinger, causing it to rotate relative to the torque tube instead of with it. This may manifest a shear force in the seal body, however, causing it to rotate relative to the torque tube, rather than with it. This relative rotation is referred to as precession and can potentially, over time, adversely affect the interference fit between the torque tube and flinger, resulting in a gap between the surfaces sufficient for leakage of oil.

In view of the above, it is desirable to provide a torque tube sealing arrangement in which cyclic precession is reduced. It is also desirable to provide a torque tube sealing arrangement that is more robust and has fewer parts than existing torque transmission and sealing arrangements.

BRIEF DESCRIPTION OF THE INVENTION

In one embodiment of the invention, a torque transmission and sealing assembly includes a ring gear having a first axial end, a second axial end opposite the first axial end, an inner surface including a plurality of teeth and an axial-facing surface at the first axial end, a barrel portion joined to the second axial end of the ring gear, and a plurality of annular, axial extending fingers integrally formed with the ring gear and extending from the axial-facing surface.

Another embodiment of the present invention relates to a torque transfer and sealing apparatus. The apparatus includes a ring gear defining an axis and having a first axial end, a second axial end opposite the first axial end, a radially inward facing surface including a plurality of teeth, and a radially outward facing surface intermediate the first axial end and the second axial end, a barrel portion joined to the second axial end of the ring gear at a radial location inward from a radial location of the radially outward facing surface, and extending axially away from the ring gear to a flanged portion, and at least one annularly shaped, axial finger integrally formed with the ring gear and extending away from the ring gear in a direction opposite the barrel portion.

Yet another embodiment of the invention relates to a method of manufacturing a torque transfer and sealing apparatus. The method includes the steps of joining a ring gear to a barrel portion, wherein the ring gear has a first axial end, a second axial end opposite the first axial end, a radially inward facing surface including a plurality of teeth, and a radially outward facing surface formed intermediate the first axial end and the second axial end. The ring gear is joined to the barrel portion at about the second axial end of the ring gear, and at a radial location inward from a radial location of the outward facing surface, the barrel portion extending axially away from the ring gear. The method also includes integrally forming a plurality of axially extending, annular projections with the ring gear, the annular projections extending from the ring gear in a direction opposite the barrel portion.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts.

An embodiment of the inventive torque tube and sealing assembly 20 is configured for use with a wheel assembly 16 of an OHV 10 as depicted in FIGS. 1-5. As shown, the OHV 10 is supported on paired dual rear drive tire assemblies 12 and on single front steering tire assemblies 14. Each dual rear drive tire assembly 12 is mounted on a wheel drive assembly 16, which includes a wheel frame 18 as well as the torque tube 20 and a wheel hub 22 supported on the wheel frame and fastened to the torque tube 20. The tire assemblies 12 can be bolted to the wheel hub 22 as further discussed below. The wheel frame 18 also supports a brake assembly 24, which is disposed adjacent to an outboard end of the wheel hub 22 but is not fastened to the wheel hub.

Each wheel assembly 16 can be bolted to the vehicle 10 by way of a mounting flange 26 provided on the wheel frame 18. The wheel frame 18 is radially tapered from the mounting flange 26, through a generally conical or hyperbolic transition portion 28, to a main cylindrical or substantially cylindrical tube portion shown in FIG. 5, discussed below. The torque tube 20 is disposed around the radially outward facing surface of the tube portion of the wheel frame 18. On the transition portion 28 of the wheel frame 18, an oil seal ring 30 is fixed to the wheel frame 18.

An embodiment of the inventive torque tube 20 includes a ring gear 34 adjacent to the oil seal ring 30, and also includes a barrel portion 36 that extends from the ring gear 34 along the wheel frame to a hub flange 38. In an embodiment, the ring gear 34 and barrel portion 36 are integrally formed. In another embodiment, the ring gear, barrel portion, and hub flange are integrally formed. The end of the ring gear 34 adjacent to the oil seal ring 30 is formed with a plurality of concentric annular protrusions 32 that creates a geometry resembling fingers, as discussed in detail hereinafter.

Figure 1:
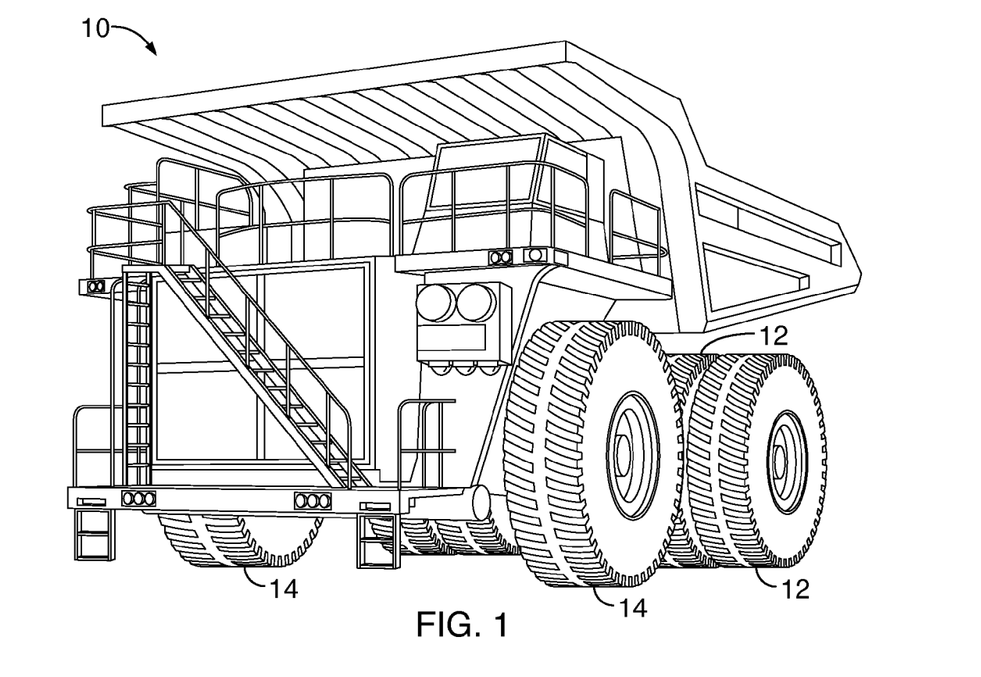
FIG. 1 shows a perspective view of an OHV.
Figure 2:
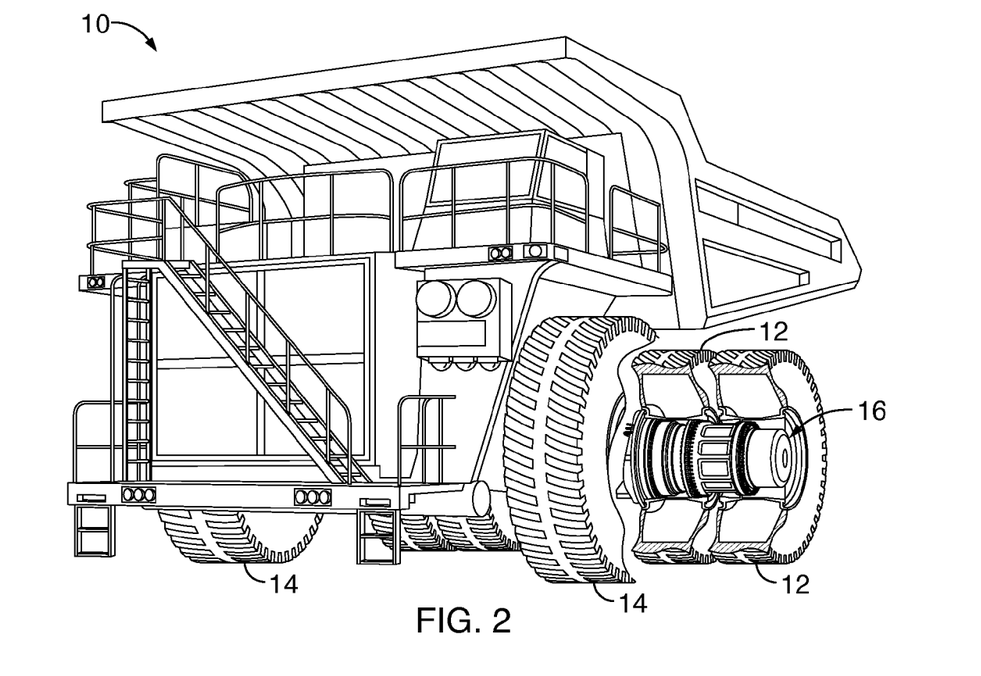
FIG. 2 shows a partial perspective cutaway view showing a wheel drive assembly of the OHV shown in FIG. 1.
Figure 3:
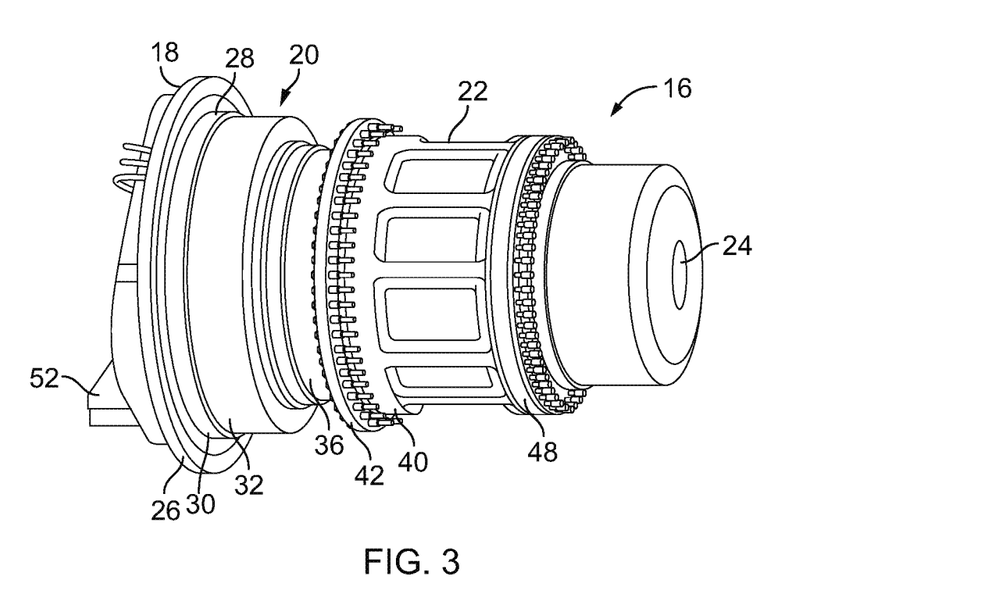
FIGS. 3 and 4 show partial side and end perspective views of the wheel drive assembly shown in FIG. 2 incorporating a torque tube in accordance with an embodiment of the present invention.
Figure 4:
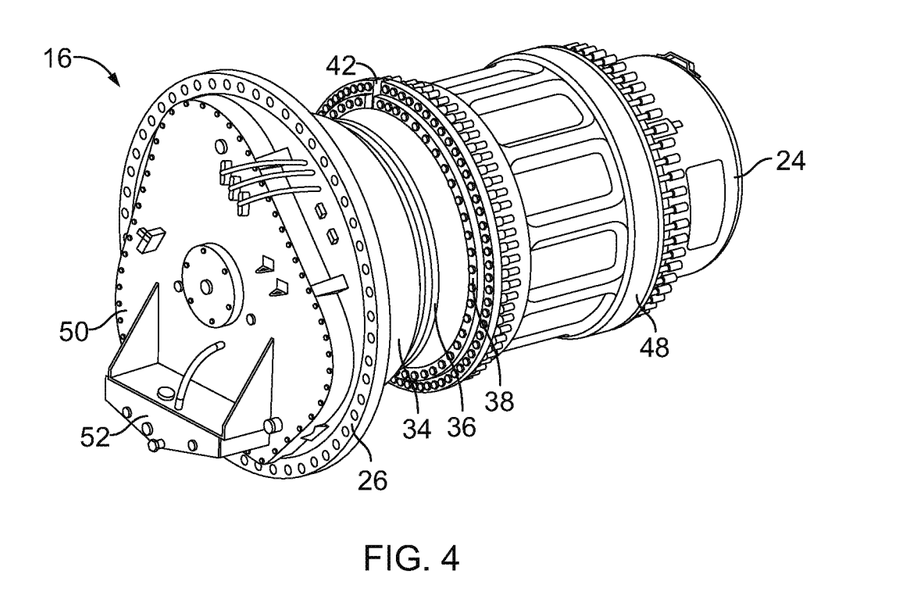
Figure 5:
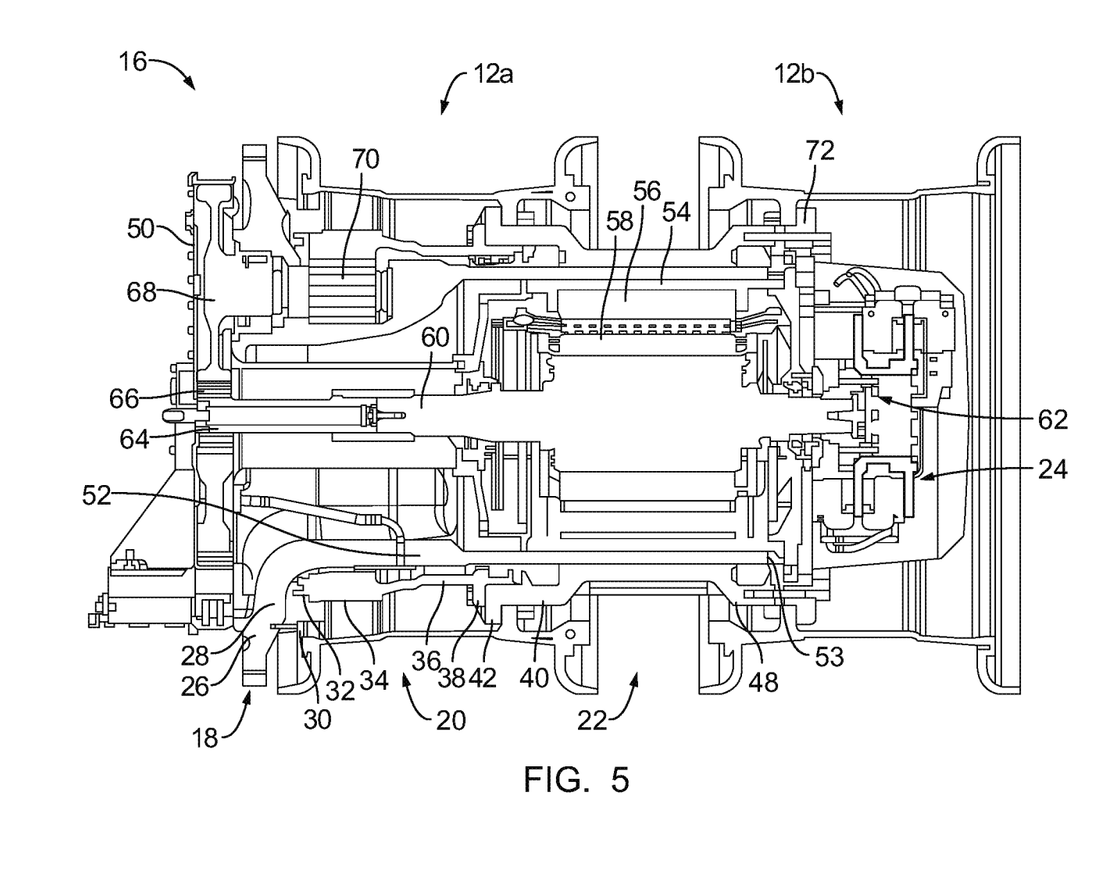
FIG. 5 shows a side sectional view of the wheel drive assembly shown in FIGS. 3 and 4.

FIG. 5 is a side sectional view illustrating multiple components of the wheel assembly 16 and their relationship to the wheel hub 22 and wheel frame 18. As shown, at the inboard and outboard ends 40, 48 of the wheel hub 22, inboard and outboard bearings, respectively, are provided to support the wheel hub on a wheel frame barrel 52. The wheel frame barrel 52 extends from the transition portion 28 to an annular hub end surface 53, to which the brake assembly 24 is mounted. Adjacent the hub end surface 53, an electric motor 54 is housed inside the wheel frame 18. The electric motor 54 includes a stator 56 and a rotor 58, from which a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the wheel frame 18, a sun gear shaft 64 is splined to the first end of the shaft 60. The sun gear shaft 64 supports a sun gear 66 housed centrally within the gear cover 50. The sun gear 66 is meshed with a plurality of planet gears 68 carried on common axles with pinion gears 70, which mesh with internal teeth of the torque tube ring gear 34. In some embodiments, there are three planet gears 68 and three pinion gears 70. The torque tube 20 is supported between the pinion gears and the wheel hub 22.

Referring to the wheel hub 22, an inboard tire assembly 12a (partially shown) is bolted to the rim flange 42. At the outboard end 48 of the wheel hub 22, a hub adapter 72 is bolted to the wheel hub 22 and an outboard tire assembly 12b (partially shown) is bolted to the hub adapter 72.

Figure 6:
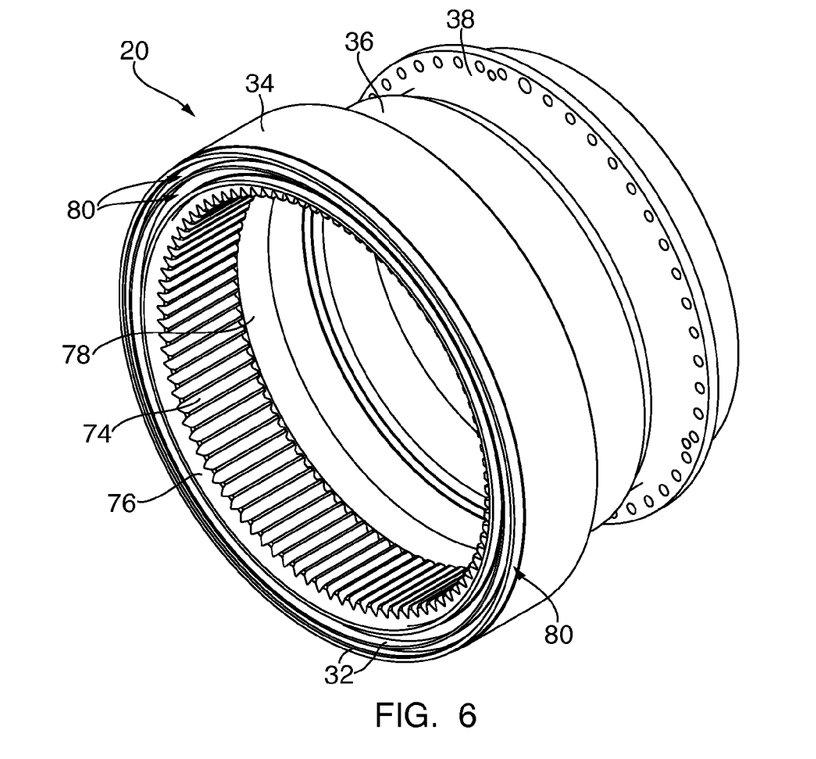
FIG. 6 shows an end perspective view of a torque tube and sealing assembly in accordance with an embodiment of the present invention in the wheel drive assembly shown in FIG. 5.
Figure 7:
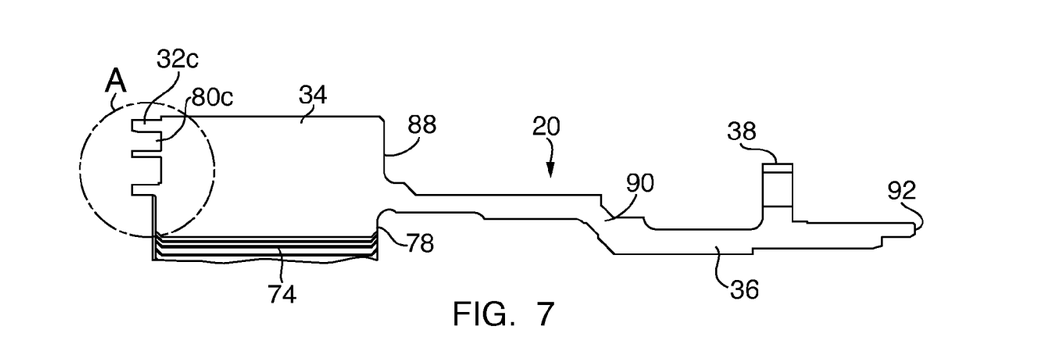
FIG. 7 shows a side sectioned view of the torque tube and sealing assembly shown in FIG. 6.
Figure 8:
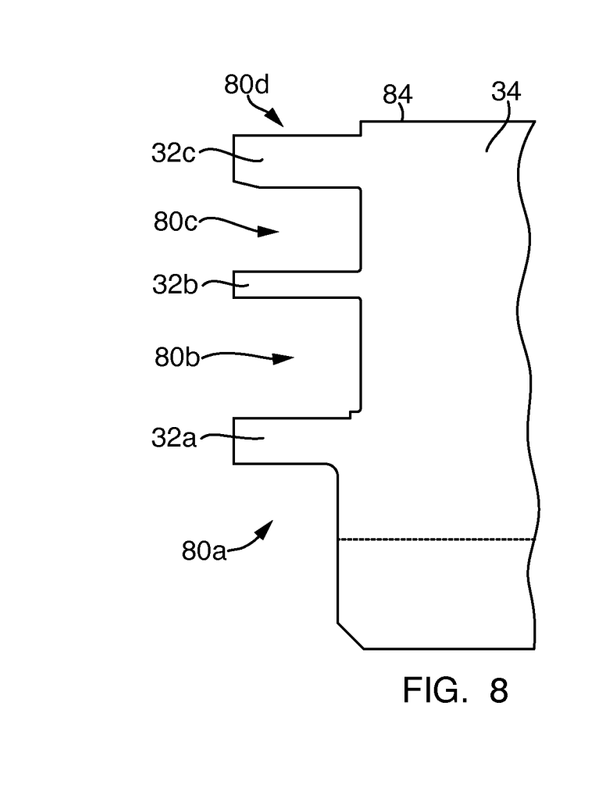
FIG. 8 shows an enlarged, detail view of area A of the torque tube and sealing assembly of FIG. 7.

FIGS. 6-8 illustrate an embodiment of the torque tube assembly 20, including the annular fingers 32, ring gear 34, the barrel portion 36, and the hub flange 38. Referring particularly to FIGS. 6 and 7, the annular fingers 32 are integrally formed with, and extend in the axial direction from an axial-facing sealing surface 76 of the ring gear 34 of the torque tube assembly 20, defining a plurality of annular grooves therebetween. As also shown therein, the ring gear 34 includes internal teeth 74 that extend from the axially-facing annular sealing surface 76 along a radially inward facing surface of the ring gear 34 to a smooth inward facing surface 78 of the barrel portion 36.

Still referring to FIG. 7, the ring gear 34 terminates at a shoulder 88 from which a frustoconical portion 90 continues to the barrel portion 36. The barrel portion 36 extends from the frustoconical portion 90 to a hub end face 92 of the torque tube assembly 20. The hub flange 38 protrudes radially outward from the barrel portion 36 about midway between the frustoconical portion 90 and the hub end face 92.

Referring now to FIG. 8, an enlarged detail view of the ring gear end of the torque tube assembly 20 is shown. As shown therein, the plurality of annular fingers 32 are substantially concentric and include a first, innermost annular finger 32a, an intermediate annular finger 32b, and an outermost annular finger 32c. The annular fingers 32a-32c define annular grooves 80 therebetween, which include a first annular groove 80a, a second annular groove 80b spaced radially outward from the first annular groove 80a, a third annular groove 80c spaced radially from outward from the second annular groove 80b, and a fourth radial groove 80d spaced radially outward from the third annular groove 80c. In an embodiment, the outermost, fourth annular groove 80d is recessed approximately 0.25" (6 to 7 mm) from an outward facing surface 84 of the ring gear 34, annular groove 80c is approximately 1.61" (40.5 to 41.5 mm) in width in the radial direction and annular groove 80b is approximately 2.315" (58.5 to 59.5 mm) in width in the radial direction.

In an embodiment, the innermost, first annular finger 32a has a radial thickness of approximately ⅞ inches (0.875"; 22 to 23 mm) and extends from the axial-facing sealing surface 76 approximately 1" (25 to 26 mm) in the axial direction. In an embodiment, the second annular finger 32b has a radial thickness of approximately 0.5" (12 to 13 mm) and extends approximately 1.12" (28 to 29 mm) in the axial direction, while the outermost, third annular finger 32c has a radial thickness of approximately 1.0" (25 to 26 mm) and extends approximately 1.12" (28 to 29 mm) in the axial direction. As will be readily appreciated, the integral annular fingers 80a-80c are therefore more robust, in cross-section, as compared to the fingers on existing flingers, thereby decreasing the potential for damage. While the embodiments herein are illustrated as having three fingers, it will be readily appreciated that more or fewer than three fingers may be utilized without departing from the broader aspects of the present invention.

In operation, the internal teeth 74 of the ring gear 34 engage with teeth on each of the pinion gears 70, as shown in FIG. 5. Torque is transferred from the electric motor rotor 58 to the ring gear 34, via the shafts 60 and 64 and the gears 66, 68, 70. The torque tube 20 further transfers torque from the ring gear 34 to the hub flange 38, and then to the wheel hub 22. In an OHV such as vehicle 10, the transferred torque may be on the order of ten to twenty thousand foot-pounds.

Referring again to FIG. 7, the barrel portion 36 of the torque tube assembly 20 is joined to the ring gear 34 via the frustoconical portion 90, which merges with the ring gear shoulder 88 at a radial location disposed radially inward from the ring gear 34. By joining the barrel portion 36 to the ring gear 34 at a radial location inward of the ring gear 34, rigidity is enhanced during operation of the wheel drive assembly 16. Moreover, finger precession is eliminated by integrally forming annular fingers 32 with the axial end of the ring gear 34, rather than mechanically fastening a discrete flinger body onto the axial end of the ring gear 34.

Figure 9:
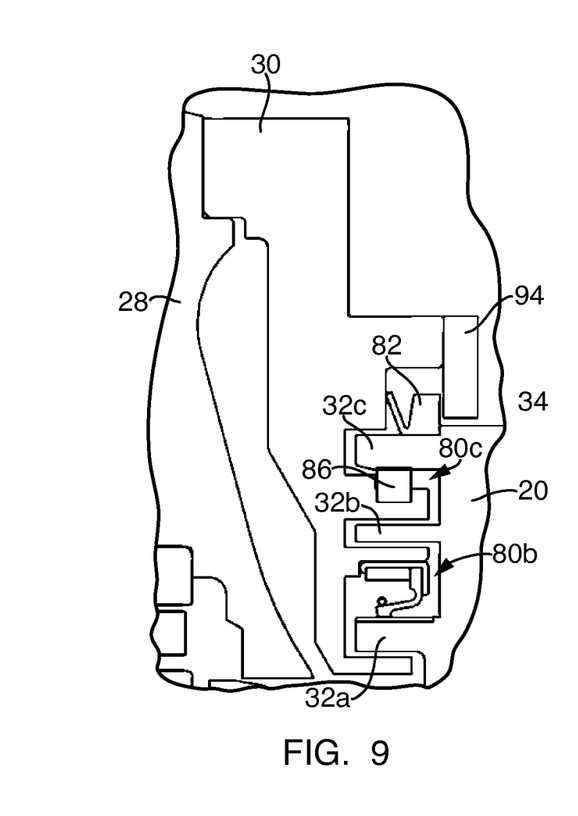
FIG. 9 shows a side sectioned partial view of the torque tube and sealing assembly shown in FIGS. 6-8, assembled with an oil seal ring and a wheel frame of the wheel drive assembly shown in FIG. 5.

FIG. 9 shows a detail view from FIG. 5, more clearly illustrating assembly 20 and interaction of the oil seal ring 30, annular fingers 32, annular grooves 80, and ring gear 34. More specifically, the annular grooves 80a-80d and annular fingers 32a-32c engage corresponding fingers and grooves of the seal ring 30 to form a sealing labyrinth. The integral nature of the annular fingers 32 and the ring gear 34, as well as the nesting of the annular fingers 32 with the complimentary grooves formed in the seal ring 30 function to limit the potential for oil leakage.

To further limit the potential for oil leakage, a seal element 82 may be disposed intermediate the seal ring 30 and torque tube assembly 20. In particular, the seal element 82 extends circumferentially around the outermost finger 32c, and sits in the outermost annular groove 80d. In certain embodiments, the seal element 82 may be a deformable seal element such as an O-ring or excluder seal. In an embodiment, felt packing 86 may also be disposed between the seal ring 30 and one or more of the fingers 32a-32c to enhance sealing. Moreover, in an embodiment, a rock block 94 may be mounted to a portion of the seal ring 30 to protect the excluder seal 82 and function as a replaceable, sacrificial component.

By essentially merging the flinger and torque tube into a single, integral torque tube assembly, flinger precession is substantially eliminated. In particular, because the fingers 32a-32c are integrally formed with the ring gear 34, rather than being a separate component bolted thereto, the entire torque tube and sealing assembly rotates as a single unit. As a result of this unitary design, the torque tube and sealing assembly 20 of the present invention is able to perform both torque transmission as well as sealing duties. Moreover, as the torque tube and sealing assembly is formed as a single, integral component, this design obviates the multitude of clamps, bolts, and washers that are necessary in existing designs to mount the flinger to the torque tube. As a result, the labor required for assembly, disassembly, and service is greatly reduced. In addition, because flinger precession is substantially eliminated, the service life of the torque tube and sealing assembly 20, as well as the wheel assembly as a whole, is substantially increased.

In use, an embodiment of the invention may include a torque tube for use in an OHV, e.g., a 200+ ton mining haul truck. The OHV comprises at least two wheel assemblies. Each wheel assembly includes a torque transfer mechanism, which includes the inventive unified torque transmission and sealing assembly. The torque transmission and sealing assembly includes a ring gear having a first axial end, a second axial end opposite the first axial end, an inner surface including a plurality of teeth and an axial-facing surface at the first axial end, a barrel portion joined to the second axial end of the ring gear, and a plurality of annular, axial extending fingers integrally formed with the ring gear and extending from the axial-facing surface.

In an embodiment, the barrel portion is joined to the second axial end of the ring gear at a radial location inward from a radial location of an outer surface of the ring gear.

In an embodiment, the plurality of axially extending fingers is three fingers, each of the fingers being concentric.

In an embodiment, at least one of the fingers has a radial thickness of ⅞ inches or greater. In an embodiment, the fingers extend from the axial-facing surface at least 1 inch.

In an embodiment, the plurality of fingers are configured to mesh with complimentary shaped features of a seal ring.

In an embodiment, the assembly includes a circumferential excluder seal encompassing an outer periphery of at least one of the plurality of fingers.

In an embodiment, the assembly may also include a rock block mounted to the seal ring and configured to protect the excluder seal from impact from debris.

Another embodiment of the present invention relates to a torque transfer and sealing apparatus. The apparatus includes a ring gear defining an axis and having a first axial end, a second axial end opposite the first axial end, a radially inward facing surface including a plurality of teeth, and a radially outward facing surface intermediate the first axial end and the second axial end, a barrel portion joined to the second axial end of the ring gear at a radial location inward from a radial location of the radially outward facing surface, and extending axially away from the ring gear to a flanged portion, and at least one annularly shaped finger integrally formed with the ring gear and extending away from the ring gear in a direction opposite the barrel portion.

In an embodiment, the at least one finger may be configured to be received in a complimentary shaped groove in a seal ring of a wheel frame such that the at least one finger and the groove defining a sealing labyrinth configured to prevent the leakage of oil.

In an embodiment, the at least one finger has a radial thickness of ⅞ inches or greater.

In an embodiment, the at least one finger extends from the ring gear at least 1 inch.

In an embodiment, the apparatus may also include a circumferential excluder seal extending along outer periphery of the at least one annular finger.

In an embodiment, the apparatus may further include a rock block mounted to the seal ring and configured to protect the excluder seal from impact from debris.

Another embodiment of the invention relates to a method of manufacturing a torque transfer and sealing apparatus, by joining a ring gear to a barrel portion, wherein the ring gear has a first axial end, a second axial end opposite the first axial end, a radially inward facing surface including a plurality of teeth, and a radially outward facing surface formed intermediate the first axial end and the second axial end. The ring gear is joined to the barrel portion at about the second axial end of the ring gear, and at a radial location inward from a radial location of the outward facing surface, the barrel portion extending axially away from the ring gear. The method also includes integrally forming a plurality of axially extending, annular projections with the ring gear, the fingers extending from the ring gear in a direction opposite the barrel portion.

In an embodiment, the method may include the step of fitting an excluder seal about the outer periphery of one of the plurality of annular projections.

In an embodiment, the method may include the step of inserting the plurality of annular projections in complimentary shaped grooves in a seal ring of a wheel frame, such that the at least one finger and the groove define a sealing labyrinth configured to prevent the leakage of oil.

In an embodiment, the plurality of annular projections comprises three annular projections (e.g., three or more, or only three).

In an embodiment, an outermost annular projection of the plurality of annular projections is inset approximately 0.25 inches from the outward facing surface.

According to one aspect, with reference to FIG. 7, an axis (axial direction) of the torque tube is the direction of the center axis of rotation, namely, horizontal from the perspective of FIG. 7, whereas a radius (radial direction) of the torque transmission and sealing assembly is the direction of a radius or diameter of the circle defined by the ring gear, namely, vertical from the perspective of FIG. 7.

In another embodiment, a torque transmission and sealing assembly comprises a ring gear, a barrel portion, and a plurality of annular, axial extending fingers. The ring gear has a first axial end, a second axial end opposite the first axial end, an inner surface including a plurality of teeth, and an axial-facing surface at the first axial end. The barrel portion is joined to the second axial end of the ring gear. The fingers are integrally formed with the ring gear and extend from the axial-facing surface of the first axial end (e.g., in a direction opposite the barrel portion). The ring gear is annular and has a center axis, and the axial-facing surface of the ring gear is annular and perpendicular to the inner surface of the ring gear. The plurality of fingers comprises an innermost, first annular finger, an intermediate, second annular finger concentric with the first annular finger, and an outermost, third annular finger concentric with the first and second annular fingers. (For example, a body of each annular finger may define a respective major circle (i.e., largest circle defined by the shape of the body) with a respective radius; the radius of the outermost, third annular finger is larger than the radius of the intermediate, second annular finger, which is larger than the radius of the innermost, first annular finger.) Each of the first annular finger, the second annular finger, and the third annular finger is coaxial with the center axis of the ring gear. Each of the first annular finger, the second annular finger, and the third annular finger has a respective thickness in a radial direction perpendicular to the center axis of the ring gear and a respective length (which in some embodiments is longer than the respective thickness) in an axial direction of the center axis of the ring gear. The axial direction is perpendicular to the axial-facing surface of the ring gear. The first annular finger is separated from the second annular finger by a first annular groove located concentrically between the first annular finger and the second annular finger, and the second annular finger is separated from the third annular finger by a second annular groove located concentrically between the second annular finger and the third annular finger. The first and second annular grooves are concentric with one another. The annular groves may be rectangular in radial cross-section.

Another embodiment relates to a wheel system comprising an oil seal ring assembly and a torque transmission and sealing assembly. The torque transmission and sealing assembly comprises a ring gear, a barrel portion, and a plurality of annular, axial extending fingers. The ring gear has a first axial end, a second axial end opposite the first axial end, an inner surface including a plurality of teeth, and an axial-facing surface at the first axial end. The barrel portion is joined to the second axial end of the ring gear. The fingers are integrally formed with the ring gear and extend from the axial-facing surface. The ring gear is annular and has a center axis, and the axial-facing surface of the ring gear is annular and perpendicular to the inner surface of the ring gear. The plurality of fingers comprises an innermost, first annular finger, an intermediate, second annular finger concentric with the first annular finger, and an outermost, third annular finger concentric with the first and second annular fingers. (For example, a body of each annular finger may define a respective major circle (i.e., largest circle defined by the shape of the body) with a respective radius; the radius of the outermost, third annular finger is larger than the radius of the intermediate, second annular finger, which is larger than the radius of the innermost, first annular finger.) Each of the first annular finger, the second annular finger, and the third annular finger is coaxial with the center axis of the ring gear. Each of the first annular finger, the second annular finger, and the third annular finger has a respective thickness in a radial direction perpendicular to the center axis of the ring gear and a respective length, longer than the respective thickness, in an axial direction of the center axis of the ring gear. The axial direction is perpendicular to the axial-facing surface of the ring gear. The first annular finger is separated from the second annular finger by a first annular groove located concentrically between the first annular finger and the second annular finger, and the second annular finger is separated from the third annular finger by a second annular groove located concentrically between the second annular finger and the third annular finger. The first and second annular grooves are concentric with one another. The annular groves may be rectangular in radial cross-section. The oil seal ring assembly comprises an oil seal ring body with grooves/fingers that correspond to those of the torque transmission and sealing assembly, e.g., the fingers of the torque transmission and sealing assembly fit within correspondingly shaped grooves of the oil seal ring assembly. The oil seal ring assembly further comprises one or more seal members for sealing the interface between the oil seal ring body and the ring gear of the torque transmission and sealing assembly.

In another embodiment, a torque transmission and sealing assembly comprises a ring gear, a barrel portion, and seal means for establishing a sealing connection between the torque transmission and sealing assembly and an adjacent oil seal ring. The ring gear has a first axial end, a second axial end opposite the first axial end, an inner surface including a plurality of teeth, and an axial-facing surface at the first axial end. The barrel portion is joined to the second axial end of the ring gear. The seal means is attached to the axial-facing surface of the ring gear. For example, the seal means may comprise annular fingers as described herein, such as two annular fingers, or three annular fingers, and associated groove(s) between the fingers.

According to an aspect of the invention, integrally formed features are those made of the same piece of material, through casting, machining, etc. In another aspect, integrally formed features are those that are permanently attached to one another, by welding or other bonding, for example such that the features behave the same (or at least similarly) to how they would behave (e.g., in normal operation of the machine of which the features are a part) if made of the same piece of material.

While the system and method for unified torque transmission and rotary sealing has been herein described in connection with electrically-driven OHVs, the system and method is equally applicable to vehicles, generally, including mechanically driven vehicles and the like.

As used herein, the terms "substantial", "substantially", or "about" are intended to indicate a condition within reasonably achievable manufacturing and assembly tolerances, relative to an ideal desired condition suitable for achieving the functional purpose of a component or assembly. By way of an example, a "substantially" flat surface may nonetheless include small, microscopic, or perceptible roughnesses, prominences, or indentations, so long as those non-flat features do not interfere with the intended purpose of the substantially flat surface. Similarly, as another example, an assembly of components in "substantial" alignment to a common axis of rotation may deviate from perfectly co-axial alignment so long as all the components can rotate as intended for accomplishing the functional purpose of the assembly.

"Interference fit," as used herein, also known as a press or friction fit, is a fastening between two parts which is achieved by friction between the parts, rather than by any other attachment mechanism. For metal parts in particular, the friction that holds the parts together is often greatly increased by compression of one part against the other, which relies on the tensile and compressive strengths of the materials the parts are made from. An interference fit is generally achieved by shaping the two mating parts so that one or the other (or both) slightly deviate in size from the nominal dimension. The word interference refers to the fact that one part slightly interferes with the space that the other is taking up.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those ordinarily skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described unified torque transmission and sealing assembly, torque transfer and sealing apparatus, and method for manufacturing a torque transfer and sealing apparatus, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A torque transmission and sealing assembly, comprising:
   a ring gear having a first axial end, a second axial end opposite the first axial end, an inner surface including a plurality of teeth, and an axial-facing surface at the first axial end;
   a barrel portion joined to the second axial end of the ring gear; and
   a plurality of annular, axial extending fingers integrally formed with the ring gear and extending from the axial-facing surface, the ring gear and the plurality of axially extending fingers defining a unitary component.

2. The torque transmission and sealing assembly of claim 1, wherein:
   the barrel portion is joined to the second axial end of the ring gear at a radial location inward from a radial location of an outer surface of the ring gear.

3. The torque transmission and sealing assembly of claim 1, wherein:
   the plurality of axially extending fingers comprises three fingers, wherein the three fingers are concentric with one another.

4. The torque transmission and sealing assembly of claim 1, wherein:
   at least one of the fingers has a radial thickness of ⅞ inches or greater.

5. The torque transmission and sealing assembly of claim 1, wherein:
the fingers extend from the axial-facing surface at least 1 inch.

6. The torque transmission and sealing assembly of claim 1, wherein:
the plurality of fingers are configured to mesh with complimentary shaped features of a seal ring.

7. The torque transmission and sealing assembly of claim 6, further comprising:
a circumferential excluder seal disposed in an outer periphery of an outermost finger of the plurality of fingers.

8. The torque transmission and sealing assembly of claim 7, further comprising:
a rock block mounted to the seal ring and configured to protect the excluder seal from impact from debris.

9. The torque transmission and sealing apparatus of claim 1, wherein:
the ring gear is annular and has a center axis, and the axial-facing surface of the ring gear is annular and perpendicular to the inner surface of the ring gear;
the plurality of fingers comprises an innermost, first annular finger, an intermediate, second annular finger concentric with the first annular finger, and an outermost, third annular finger concentric with the first and second annular fingers;
each of the first annular finger, the second annular finger, and the third annular finger is coaxial with the center axis of the ring gear;
each of the first annular finger, the second annular finger, and the third annular finger has a respective thickness in a radial direction perpendicular to the center axis of the ring gear and a respective length in an axial direction of the center axis of the ring gear, wherein the axial direction is perpendicular to the axial-facing surface of the ring gear; and
the first annular finger is separated from the second annular finger by a first annular groove located concentrically between the first annular finger and the second annular finger, and the second annular finger is separated from the third annular finger by a second annular groove located concentrically between the second annular finger and the third annular finger, the first and second annular grooves being concentric with one another.

10. The torque transmission and sealing apparatus of claim 9, wherein the respective length of each of the first annular finger, the second annular finger, and the third annular finger is longer than the respective thickness of each of the first annular finger, the second annular finger, and the third annular finger.

11. A torque transfer and sealing apparatus, comprising:
a ring gear defining an axis and having a first axial end, a second axial end opposite the first axial end, a radially inward facing surface including a plurality of teeth, and a radially outward facing surface intermediate the first axial end and the second axial end;
a barrel portion joined to the second axial end of the ring gear at a radial location inward from a radial location of the radially outward facing surface, and extending axially away from the ring gear to a flanged portion;
at least one annularly shaped finger integrally formed with the ring gear and extending away from the ring gear in a direction opposite the barrel portion, the ring gear and the at least one annularly shaped finger defining a unitary component; and
a circumferential excluder seal disposed in an outer periphery of an outermost finger of the at least one annularly shaped finger.

12. The torque transfer and sealing apparatus of claim 11, wherein:
the at least one annular finger is configured to be received in a complimentary shaped groove in a seal ring of a wheel frame, the at least one finger and the groove defining a sealing labyrinth configured to prevent leakage of oil.

13. The torque transfer and sealing apparatus of claim 11, wherein:
the at least one finger has a radial thickness of ⅞ inches or greater.

14. The torque tube and sealing assembly of claim 11, wherein:
the at least one finger extends from the ring gear at least 1 inch.

15. The torque transfer and sealing apparatus of claim 11, further comprising:
a rock block mounted to the seal ring and configured to protect the excluder seal from impact from debris.

16. A method of manufacturing a torque transfer and sealing apparatus, the method comprising the steps of:
joining a ring gear to a barrel portion, wherein the ring gear has a first axial end, a second axial end opposite the first axial end, a radially inward facing surface including a plurality of teeth, and a radially outward facing surface formed intermediate the first axial end and the second axial end, and wherein the ring gear is joined to the barrel portion at about the second axial end of the ring gear, and at a radial location inward from a radial location of the outward facing surface, the barrel portion extending axially away from the ring gear; and
integrally forming a plurality of axially extending, annular projections with the ring gear such that the projections and the ring gear form a unitary component, the projections extending from the ring gear in a direction opposite the barrel portion.

17. The method according to claim 16, further comprising the step of:
fitting an excluder seal about an outer periphery of an outermost annular projection the plurality of annular projections.

18. The method according to claim 16, further comprising the step of:
inserting the plurality of annular projections in complimentary shaped grooves in a seal ring of a wheel frame, such that the projections and the groove define a sealing labyrinth configured to prevent the leakage of oil.

19. The method according to claim 16, wherein:
an outermost annular projection of the plurality of annular projections is inset approximately 0.25 inches from the outward facing surface.

* * * * *